(No Model.)

J. ROGERS.
INSULATING HANDLE CONNECTION.

No. 565,393. Patented Aug. 4, 1896.

WITNESSES
L. A. Stackpole
[signature]

INVENTOR
John Rogers
by [signature]
Atty.

UNITED STATES PATENT OFFICE.

JOHN ROGERS, OF TAUNTON, MASSACHUSETTS.

INSULATING HANDLE CONNECTION.

SPECIFICATION forming part of Letters Patent No. 565,393, dated August 4, 1896.

Application filed April 15, 1896. Serial No. 587,699. (No model.)

*To all whom it may concern:*

Be it known that I, JOHN ROGERS, a citizen of the United States, residing at Taunton, in the county of Bristol and Commonwealth of Massachusetts, have invented a new and useful Improvement in Insulating Handle Connections, of which the following is a full specification, reference being had to the accompanying drawings, wherein—

Figure 1:
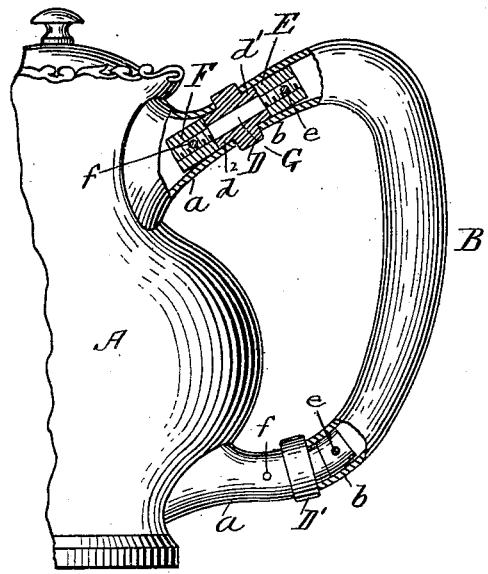
Figure 2:
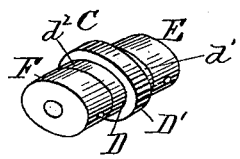
Figure 3:
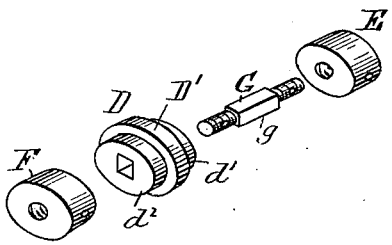

Figure 1 shows a portion of a teapot or similar article with a handle embodying my invention, showing the upper joint in section. Fig. 2 is a perspective view of my insulating connection. Fig. 3 is a view of same separated into its parts.

My invention relates to an insulating handle connection for handles of articles containing hot liquids to prevent the conduction of heat from the article to its handle; and it consists of a double-ended metallic plug having its two ends separated by a washer of ivory or any other non-conducting material, and connected by a bolt screwed into the ends and passing through the washer of ivory, which is thus clamped between the ends of these plugs. Thus an entirely metallic connection is secured which will not break or work loose.

Insulating connections have usually been made of ivory, either using a solid ivory plug having a collar or flange and a shank on each side for insertion into the ends of the handle, or a connection formed by a flanged hollow shank of ivory, which is inserted into one hollow end of the handle and receives in its hollow side a metallic plug, which forms the opposite end of the handle, a rivet passing through handle, hollow ivory shank, and plug, securing the whole together. In both of these connections the ivory after a short time becomes cracked and warped, with the result in the former case that the handle broke entirely off, while in the latter case although the connection cannot be broken by the cracking or warping of the ivory yet it becomes very loose and makes an ill-fitting joint. In my connection neither of these objections can arise, for my connection is entirely metallic, and therefore cannot warp and work loose, while at the same time the washer of ivory forms sufficient insulation.

In the drawings, A is the teapot, and B the handle, $a\,a$ and $b\,b$ being the ends of the handle on each side of the insulation.

C is my connection shown in Fig. 2, which consists of four pieces: the flanged washer D and the two plugs E and F.

G is a bolt which secures the two plugs together. It may be integral with one of the plugs, or it may be screwed into both of them, as shown.

The washer C, instead of being simply a flat disk, as appears to the eye when the joint is complete, is made in the shape shown in Fig. 3, having besides the central flange $D'$ the integral shanks $d'$ and $d^2$ projecting from each side. These shanks are of the same shape and size as the plugs E and F, so that when the connection is screwed together a smooth shank, partly of metal and partly of ivory, is formed, over which the hollow ends of the handle fit, abutting against the sides of the flange $D'$. By this means it is impossible for the washer to fall off, even if it should become warped and cracked by the heat, as the shanks $d'$ and $d^2$ project far enough into the handle to hold it firmly.

The central portion $g$ of the plug, where it passes through the washer, I preferably make square, as well as the hole in the washer, so that when the two plugs are screwed firmly together with the washer between them, as shown in Fig. 2, the washer cannot be twisted around, even if in time it should become warped and loose upon the bolt.

It will thus be seen that a solid metallic connection between the plugs is secured and its rigidity and tightness do not depend at all on the washer. The small section of the connecting-bolt G allows very little heat to pass from one plug to the other while the washer insulates the large surfaces. Further, it will be seen that as these metallic plugs fit tightly into the hollow ends of the handle and are secured therein by rivets $e\,f$, passing through the handle and plug, this joint will always remain as tight as when first made and is in no way dependent on ivory or other substance which may warp. Thus a connection is formed which, while having the appearance of a solid ivory connection, uses very little ivory, and thus saves expense, insulates just as well, and can never work loose, as all the connections are metallic. To increase the insulation, a thin coating of some insulating substance may be given to the surface of the plugs before they are inserted into the handle.

I claim—

1. A new article of manufacture, an insulating handle connection, consisting of two metallic plugs connected by a metallic bolt insulated by an ivory washer, having the flange D' and shanks $d'$ $d^2$, the latter corresponding in size with the said metallic plugs, whereby the ivory shanks extend within the hollow ends of the handles as and for the purpose, substantially as described.

2. An insulating handle connection C, having the plugs F, E, washer D provided with flange D', shanks $d'$, $d^2$, and bolt G, substantially as described.

In witness whereof I have hereunto set my hand.

JOHN ROGERS.

Witnesses:
   L. A. HODGES,
   F. L. FISH.